Sept. 12, 1933.   A. NUTT ET AL   1,926,349
VALVE OPERATING MECHANISM
Filed Sept. 30, 1930
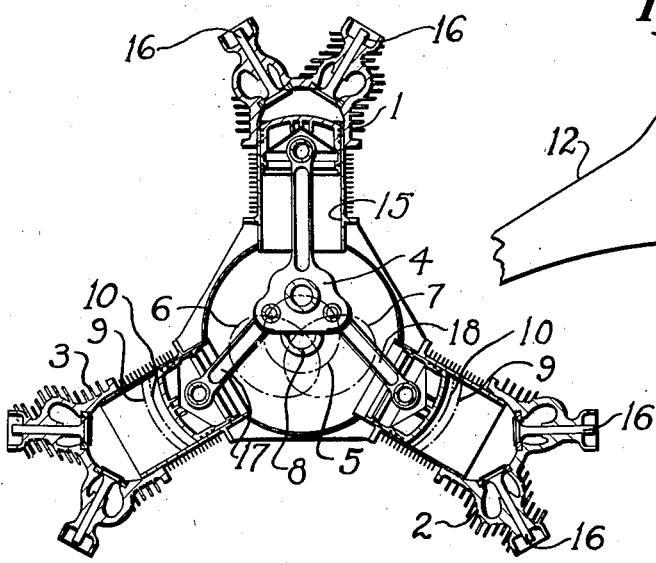
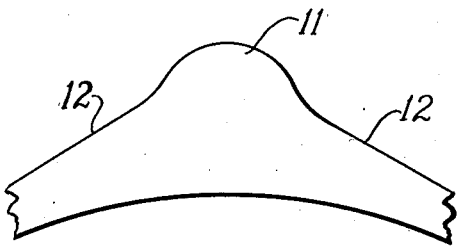
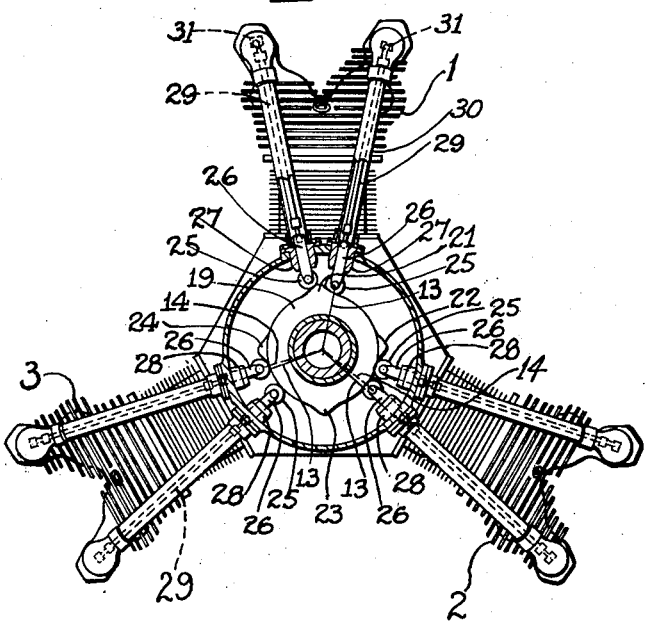
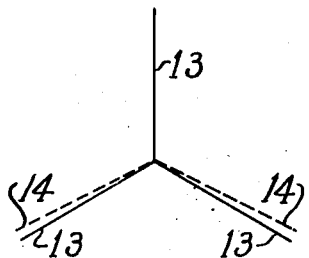
INVENTORS
ARTHUR NUTT
ARTHUR H. LEAK
BY HARRY L. CHISHOLM Jr.
ATTORNEYS.

Patented Sept. 12, 1933

1,926,349

UNITED STATES PATENT OFFICE 1,926,349

VALVE OPERATING MECHANISM

Arthur Nutt, Eggertsville, Arthur H. Leak, Hamburg, and Harry L. Chisholm, Jr., Buffalo, N. Y., assignors to Curtiss Aeroplane & Motor Company, Inc., a corporation of New York Application September 30, 1930
Serial No. 485,408

6 Claims. (Cl. 123—55)

Our invention relates to improvements in valve operating mechanisms for radial internal combustion engines, and is especially adapted for engines used in aeronautics.

In engines of this type there is usually a principal or master connecting rod to which the crankshaft ends of the other rods are articulated. As a consequence of this construction the pistons of the articulated rods do not travel with the same speed at given points of the respective strokes as the piston of the master rod or of each other. Similarly, a valve operating mechanism arranged with equally spaced cams and followers, operating the usual push rods, will not cause the valves associated, with the pistons of the articulated rods to open and close at the same relative points of the piston strokes as the opening and closing points of the valves associated with the piston of the master rod. These differences are due to the crankshaft end of the master rod describing a circle while the crankshaft ends of the articulated rods describe irregular ellipses. The most noticeable effects of this lack of piston phase symmetry are an irregular and discordant exhaust noise and vibration of the engine.

One object of this invention is to correct the above defects. This is accomplished by so arranging the valve mechanism that in all the cylinders the valves open and close at the same relative points of their strokes, i. e., the valves in the cylinders associated with the articulated rod pistons open and close at the same relative piston position, as the valves in the cylinder associated with the master rod piston. To this end the cam followers are offset from their normal center lines by such an amount as will compensate for the out of phase timing of the valve's opening and closing points, and more especially for the timing of exhaust valves openings and intake valves closings. Also the leading and trailing portions of the cam profiles are shaped to give constant velocity of valve opening. On the exhaust opening function this insures that when the valve cracks open the speed of the gas released will be of constant velocity irrespective of any variation in valve clearances due to unequal cylinder expansion, valve gear wear or neglect of proper adjustment.

On some engines the articulated rod cylinders have a slightly different length of stroke as compared with that of the master rod cylinders. Where this occurs the correction of the valve gear is based on the master rod cylinder percentage of stroke. Where all cylinders have the same stroke, the described changes in the usual valve gear effect an identical timing in all cylinders and thus smooth out the exhaust noise and engine vibration.

In the drawing, in which like parts are represented by like numerals:

Fig. 1 shows the master rod 4 with its circular crankpin path 5 and the elliptical paths 6 and 7 of the pins of the articulated rods 17 and 18;

Fig. 2 shows the type of cam used with the offset cam followers;

Fig. 3 shows the center lines 13 of the usual cam followers and the center lines 14 of the offset cam followers, (dotted); and Fig. 4 is a sectional view of the motor shown in Fig. 1 taken to show the cam and the cam followers by which the valves are actuated.

In Fig. 1—1, 2 and 3 are the cylinders of a three cylinder radial engine. 4 is the master connecting rod and 17 and 18 the articulated rods. 8 is the crankshaft. 5 is the circular path of the master rod pin and 6 and 7 are the elliptical paths of the pins of the articulated rods.

In cylinders 2 and 3 the lines 10, 10 show the position of the piston when the exhaust valve cracks open using the usual type of valve gear. The lines 9, 9 show where the piston should be when the exhaust valves crack open to be in symmetry with the master rod cylinder piston. The distance between the lines 9, 9 and 10, 10 is a measure of the lack of phase symmetry of the valve timing.

In Fig. 3 the lines 13, 13, 13 represent diagrammatically the center lines of the exhaust valve cam followers when equally spaced and which equal spacing produces the lack of timing phase symmetry as shown by the lines, 9, 9 and 10, 10. Offsetting the cam followers as indicated by the dotted center lines, 14, 14 will cause the lines 9, 9 and 10, 10 to coincide and thus cause the exhaust valves to open at the same relative portion of the stroke in all the cylinders. Similarly the closing of the inlet valves in all cylinders may be regulated as to phase symmetry.

We have shown in Fig. 4 a method of offsetting the cam followers in order to compensate for the unequal timing occasioned by the use of a master connecting rod and articulated connecting rods. This illustration is merely one method by which the cam followers may be offset and many other methods will be suggested to those familiar with the art. In said Fig. 4 we have shown the cylinders 1, 2, and 3 and have indicated the center lines 13 and 14 as shown in Fig. 3. We have also shown a cam 19 formed with cam lobes 21, 22, 23 and 24. The cam and cam lobes are adapted to contact with rollers 25 rotatably secured to the inner ends of cam followers 26. The cam followers 26 for the cylinder 1, which is associated with the master rod 4, are mounted in guides 27. It is to be noted that the guideway for the followers in the guides 27 are formed concentric with the periphery of said guides. The cam followers 26 for the cylinders 2 and 3 are mounted in guides 28. It is to be noted that the guideway of guides 28 are eccentric with the periphery of said guides and inasmuch as the bores in the crank case thru which the guides are fitted are positioned 120° apart, the cam followers are necessarily positioned slightly more or less than that distance apart, i. e., they are unequally spaced.

The outer ends of the cam followers 26 are attached to push rods 29 which extend upward thru the push rod housings 30 and are attached at their outer ends to the rocker arms 31 by which the valves 16 are actuated.

Fig. 2 shows the shape of valve cam best adapted to be used with the offset cam followers. The entering and trailing edges 12, 12 are of the constant velocity, zero acceleration type while the main portion, 11, may be of any preferred contour.

It is to be carefully borne in mind that the rate at which an exhaust valve opens has a marked effect on the character of the sound emitted. In order that all the exhaust valves will open at the same rate, regardless of variations in the individual clearances, the portions 12, 12 of the cams must be of a contour that will impart a constant velocity to the cam follower.

While we have described our invention in detail in its present embodiment, it will be obvious to those skilled in the art after understanding our invention, that various changes and modifications may be made therein without departing from the spirit or scope thereof. We aim in the appended claims to cover all such modifications and changes.

What we claim is:

1. In an internal combustion engine, radially arranged equally spaced cylinders, pistons for said cylinders, valves for said cylinders, and means for operating said valves in regular cycles of unequally spaced intervals.

2. In an engine having radially arranged cylinders, pistons for said cylinders, a crankshaft, a master rod connecting said crankshaft with one said piston, articulated rods connecting said master rod with the other said pistons, a valve for each cylinder, a cam having a lobe, and cam followers contacting at times with said lobe for operating said valves, said cam followers being so spaced with respect to their respective cylinders as to cause functioning of their respective valves at the same relative position of the piston in each said cylinder.

3. In an engine having radially arranged cylinders, pistons for said cylinders, a crankshaft, a master rod connecting said crankshaft with one said piston, articulated rods connecting said master rod with the other said pistons, a valve for each said cylinder, a plurality of cams, cam followers contacting with said cams for operating said valves, said cams and said cam followers being so spaced with respect to said cylinders as to cause functioning of the valves at the same relative position of the piston in each said cylinder.

4. In an internal combustion engine, a plurality of radially arranged equally spaced cylinders, a crankshaft, pistons in said cylinders, a master rod connected to one of said pistons and to said crankshaft, articulated rods connected to the other said pistons and to said master rod, valves for said cylinders, a cam, lobes on said cam, and cam followers spaced unequal distances apart for coacting with said cam lobes for operating said valves.

5. In an internal combustion engine, radially arranged equally spaced cylinders, pistons for said cylinders, a master rod connected to one of said pistons and to said crankshaft, articulated rods connected to the other said pistons and to said master rod, intake and exhaust valves for each of said cylinders, means for opening and closing each of said valves at the same relative positions of the associated piston in each of said cylinders, said last named means comprising a cam, a lobe on said cam, and cam followers certain of which are offset from the center line from the center of the crankshaft to the rocker arm.

6. In an internal combustion engine, radially arranged cylinders, valves for said cylinders, a cam for operating said valves, a cam follower for coacting with said cam, and a guide for said cam follower, said guide being formed with an eccentric bore.

ARTHUR NUTT.
ARTHUR H. LEAK.
HARRY L. CHISHOLM, Jr.